US008812594B2

(12) United States Patent
Iredale et al.

(10) Patent No.: US 8,812,594 B2
(45) Date of Patent: Aug. 19, 2014

(54) SYSTEM AND METHOD FOR SYNCHRONIZING ELECTRONIC POLL BOOK VOTER DATABASES

(75) Inventors: Talbot Iredale, Vancouver (CA); Ken Clark, Vancouver (CA)

(73) Assignee: Electron Systems & Software, LLC, Omaha, NE (US)

( * ) Notice: Subject to any disclaimer, the term of this patent is extended or adjusted under 35 U.S.C. 154(b) by 1075 days.

(21) Appl. No.: 12/771,523

(22) Filed: Apr. 30, 2010

(65) Prior Publication Data

US 2011/0270927 A1 Nov. 3, 2011

(51) Int. Cl.
*G06F 15/16* (2006.01)
*G06F 11/00* (2006.01)
*G06F 17/30* (2006.01)

(52) U.S. Cl.
CPC .................. *G06F 17/30581* (2013.01)
USPC ............................. 709/205; 705/12

(58) Field of Classification Search
CPC ............. G06Q 30/02; G06Q 30/0203; H04L 2209/463
See application file for complete search history.

(56) References Cited

U.S. PATENT DOCUMENTS

| | | | |
|---|---|---|---|
| 6,873,966 B2 | 3/2005 | Babbitt et al. | |
| 6,973,581 B2 | 12/2005 | Chung et al. | |
| 7,197,167 B2 | 3/2007 | Chung et al. | |
| 7,497,377 B2 | 3/2009 | Watson | |
| 7,561,724 B2 | 7/2009 | Chung et al. | |
| 7,640,181 B2 | 12/2009 | McClure et al. | |
| 8,260,660 B2* | 9/2012 | Carbullido et al. | 705/12 |
| 2003/0149616 A1 | 8/2003 | Travaille | |
| 2003/0208395 A1 | 11/2003 | McClure et al. | |
| 2003/0212821 A1* | 11/2003 | Gillies et al. | 709/238 |
| 2006/0026058 A1* | 2/2006 | White | 705/12 |
| 2006/0036481 A1* | 2/2006 | White | 705/12 |
| 2011/0053559 A1* | 3/2011 | Klein | 455/411 |
| 2011/0202392 A1* | 8/2011 | Carbullido et al. | 705/12 |

OTHER PUBLICATIONS

Advanced Voting Systems, document entitled "**WINPoll Book The Electronic PollBook is Here!", 2 pgs. (published more than 1 year prior to Apr. 30, 2010, the filed of this application).
Premier Election Solutions, brochure entitled "Express Poll-5000", dated Sep. 2007, 2 pgs.
Dominion Voting Systems Corporation, brochure entitled "Democracy Suite EMS", Edition 2007, 4 pgs. (published more than 1 year prior to Apr. 30, 2010, the filed of this application).

(Continued)

*Primary Examiner* — Peling Shaw
(74) *Attorney, Agent, or Firm* — Stinson Leonard Street LLP

(57) ABSTRACT

The present invention is directed to a system and method for synchronizing electronic poll book voter databases. The system includes a plurality of electronic poll books in communication over a network, each poll book having a unique identifier and each including a voter database of voter information. Each poll book is operable to transmit its unique identifier in an information packet and receive information packets from other poll books. Each poll book arranges the transmitted and received unique identifiers in order according to a predetermined ordering scheme, and establishes communication with two other poll books and exchanges voter database information to ensure all databases have updated information. With the communication established as described, the poll books form a ring network and database information is propagated from poll book to poll book to synchronize the databases between all of the poll books.

43 Claims, 3 Drawing Sheets

(56) References Cited

OTHER PUBLICATIONS

Hart Intercivic, brochure entitled "eRegistry. Statewide Voter Registration and Election Management", 2 pgs. (published more than 1 year prior to Apr. 30, 2010, the filed of this application).

Indra, brochure entitled "Electronic Poll Book", 4 pgs. (published more than 1 year prior to Apr. 30, 2010, the filed of this application).

Sequoia Voting Systems, brochure entitled "Choices Election Management Solutions", 5 pgs. (published more than 1 year prior to Apr. 30, 2010, the filed of this application).

Election Systems & Software, Inc., brochure entitled "ES&S Electronic Pollbook(i)", 2 pgs. (published more than 1 year prior to Apr. 30, 2010, the filed of this application).

Decision Support, brochure entitled "EVID Voter Check-in Made Easy", 4 pgs. (published more than 1 year prior to Apr. 30, 2010, the filed of this application).

California Institute of Technology and the Massachusetts Institute of Technology Corporation, booklet entitled "Voting What is, What Could Be", 96 pgs. (published more than 1 year prior to Apr. 30, 2010, the filing date of this application).

* cited by examiner

SYSTEM AND METHOD FOR SYNCHRONIZING ELECTRONIC POLL BOOK VOTER DATABASES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to voting systems, and, more particularly, to a system and method for synchronizing voter databases between a plurality of electronic poll books.

2. Description of Related Art

In many voting jurisdictions, electronic poll books have replaced paper poll books for tracking registered voters and voter activity. An electronic poll book allows a poll worker to access a database of all the voters registered to vote in a particular election. In general, when a voter enters a polling place, the poll worker uses the electronic poll book to search for the voter's record in the database, confirm that the voter has not yet voted in the election, and issue a voting credit to the voter. In many jurisdictions, the database resides locally on the electronic poll book, which are periodically synchronized with a central voter database.

However, a voting system relying on a central voter database presents some drawbacks. For example, if the central voter database or the communication link to the central voter database is unavailable, none of the electronic poll books can be synchronized—potentially allowing unauthorized voting to occur. In other words, the central voter database presents a single point of failure. Furthermore, the lag time that occurs at the central voter database between the receipt of information from a poll book and the transmission of such information to the remaining poll books may be substantial, leaving open the possibility that at any given time many of the poll books do not have up-to-date information in their databases.

BRIEF SUMMARY OF THE INVENTION

The present invention is directed to a system and method for synchronizing a plurality of electronic poll book voter databases. The system includes a plurality of electronic poll books in communication over a network, each poll book having a unique identifier and each including a voter database of voter information. Each poll book is operable to transmit its unique identifier in an information packet and receive unique identifiers in information packets from other poll books communicating over the network. Each poll book arranges the transmitted and received unique identifiers in order according to a predetermined ordering scheme, and establishes communication with two adjacent poll books based on the ordered unique identifiers. Each poll book then synchronizes (i.e., exchanges and updates voter database information) with the two adjacent poll books to ensure that all databases have updated information. With the communication established as described, the poll books form a ring network and database information is propagated from poll book to poll book so that the databases of all of the poll books are synchronized. This ring arrangement provides a reliable, robust network that is not dependent on a single point of storage (i.e., a central database), and that is not dependent on any single communication path. In the event of a failure of any poll book or communication path, the system and method of the present invention automatically reconfigures based on the currently available poll books and paths.

DETAILED DESCRIPTION OF EXEMPLARY EMBODIMENTS

The present invention is directed to a system and method for synchronizing electronic poll book voter databases. While the invention will be described in detail below with reference to exemplary embodiments, it should be understood that the invention is not limited to the specific system configurations or methodologies of these embodiments. In addition, although the exemplary embodiments are described as embodying several different inventive features, one skilled in the art will appreciate that any one of these features could be implemented without the others in accordance with the invention.

Figure 1:
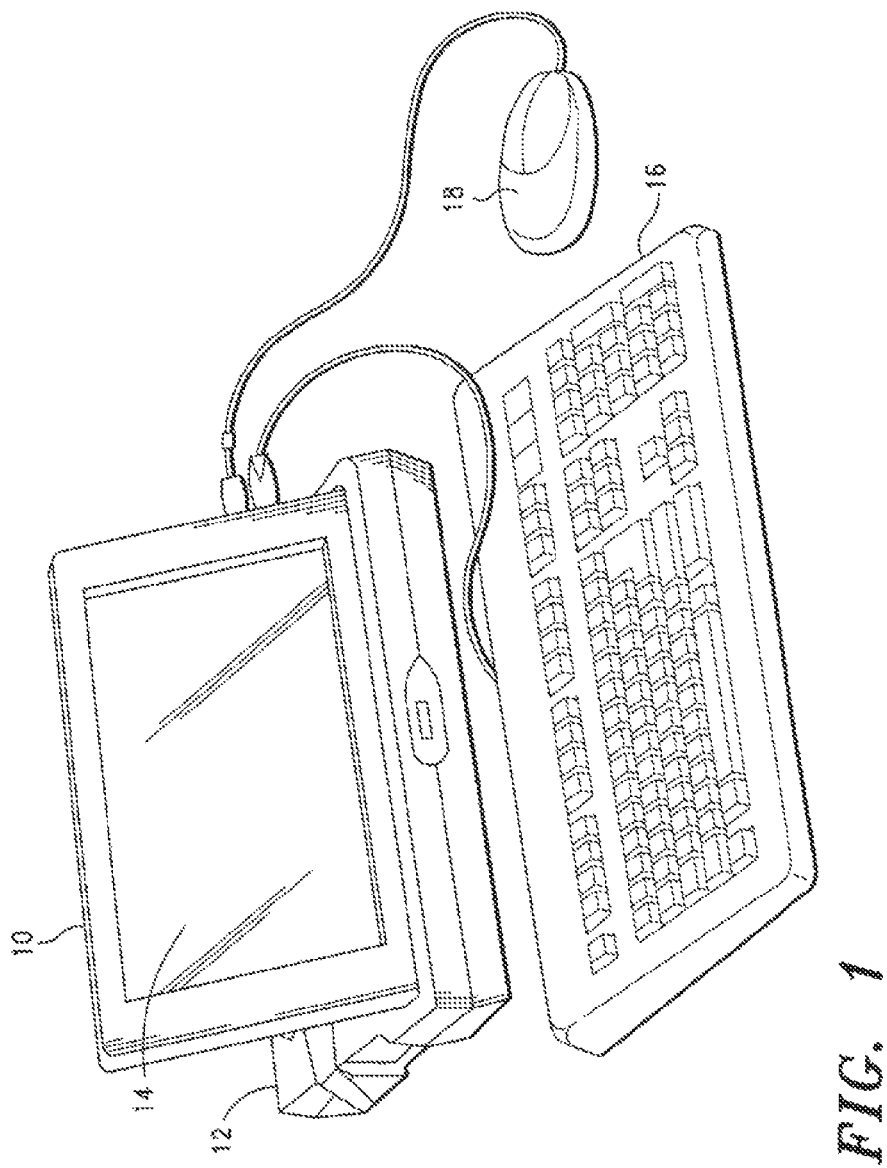
FIG. 1 is a perspective view of an electronic poll book in accordance with an exemplary embodiment of the present invention.

Referring first to FIG. 1, an electronic poll book in accordance with an exemplary embodiment of the present invention is depicted generally as reference numeral 10. In general, electronic poll book 10 is mounted on a base 12 that serves to hold the poll book 10 in a slightly-angled upright position during use. When not in use, base 12 is used as a protective case for poll book 10 during transport and storage. Preferably, poll book 10 includes a touchscreen display 14 that serves as both an input device and output device. Poll book 10 may also be connected to other types of input devices, such as a standard keyboard 16 and a mouse 18. In addition, other accessories (not shown) may be connected to poll book 10, such as a signature capture device for electronically capturing a voter's signature during voter check-in, a barcode reader for scanning a barcode on a voter registration card, a magnetic stripe reader for scanning identification cards such as a driver's license or state identification, and/or a printer for printing a paper ballot or voter receipt.

Poll book 10 comprises a computing system (such as a programmed general purpose computer, a special purpose computer, or the like) that includes a processor and a storage device for storing a voter database. The processor of poll book 10 is operable to execute computer-readable instructions (e.g., software or firmware) stored on a computer-readable medium (e.g., the computer's internal hard drive, a thumb drive or a compact flash card) to thereby perform the various processes of the present invention, as will be described in greater detail hereinbelow. The storage device of poll book 10 may comprise any type of computer memory, such as the computer's internal hard drive, a thumb drive or a compact flash card. One skilled in the art will appreciate that other types of memory devices may also be used in accordance with the present invention.

The voter database is stored locally on the storage device of poll book 10. Preferably, the database contains voter records for all of the registered voters in the jurisdiction. Several types of communication networks and connections may be used to network the poll books, including a local area network (LAN), wireless local area network (WLAN) or wide area network (WAN). The communication network may be any combination of analog, digital, wired and wireless communication equipment and infrastructure suitable for transporting information between poll books 10 connected to the network. For example, the communication network may include one or more of the following: the Internet, an intranet, a cellular communication system, a Public Switched Telephone Network (PSTN), a private telephone network, or a satellite communication system. In the exemplary embodiment, poll books communicate via a wired closed network with the central server via a wired closed network using TCP/IP or other streaming network protocol. This communication may be encrypted using TLS_PSK, SSL or other cryptographic protocols. Preferably the poll book voter database is initially installed to the poll book via distribution from a central registration database on media such as a flash drive. Alternatively, the poll book voter database can be initially installed over the communication network, such as from a central server that has a copy of the central registration database installed, or voter records may be fetched on demand from a central server in the event the information is not available locally. The poll book voter database may be a subset of the entire central registration database, with only the voter records and/or information necessary for that particular election or poll book.

The poll book has been described above with reference to the terms "processor," "storage device" and "database." It should be understood that as used herein (including in the claims) the term "processor" may mean either a single processor that performs the described processes or a plurality of processors that collectively perform the described processes; the term "storage device" means either a single storage device that stores the described database(s) or a plurality of storage devices that collectively store the described database(s); and the term "database" means either a single database that contains the described data or a plurality of databases that collectively contain the described data. Thus, the poll book may be implemented with any number of processor(s), storage device(s) and database(s) without departing from the scope of the present invention.

Figures 2, 3, 4:
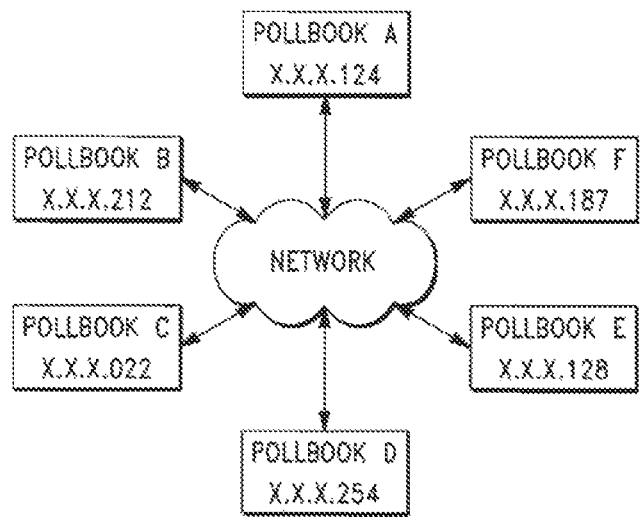
FIG. 2 is a block diagram of a network of electronic poll books, each poll book having a unique identifier in accordance with an exemplary embodiment of the present invention.
FIG. 3 is a chart summarizing the electronic poll book and unique identifier information of the network of FIG. 2.
FIG. 4 is a chart summarizing the electronic poll book information of FIG. 3, arranged in order of the unique identifier.

Referring now to FIG. 2, a block diagram depicts an exemplary network of a plurality of poll books in communication over a network. Communication with the network is indicated by the solid line connecting the poll book to the network, with the arrowheads indicating that communication occurs in both directions—to the network and from the network. Each poll book (labeled as A through F in the diagram) includes a unique identifier that identifies that particular poll book. For example, poll book A has a unique identifier of "x.x.x.124" (where x.x.x.124 represents an IP address assigned to that poll book), poll book B has a unique identifier of "x.x.x.212", and so forth as shown in FIG. 2. Note that while the exemplary embodiment in FIG. 2 uses an IP address as the unique identifier of each poll book, any unique identifier may be used in accordance with the present invention, such as a poll book serial number, a name or location of the poll book, or any other identifier uniquely associated with the poll book.

With the plurality of poll books in communication over the network as described, each poll book periodically broadcasts its unique identifier over the network, preferably in a UDP broadcast packet on a predefined port. Each poll book likewise continuously monitors network traffic to identify and capture any unique identifier information transmitted by other poll books on the network. Preferably, each poll book broadcasts its unique identifier packet periodically, most preferably at least every ten minutes.

As shown in FIG. 3, by continuously monitoring the network for poll book identification packets, each poll book thus captures a complete list of unique identifiers of all of the poll books (including itself) communicating on the network. Thus, as seen in FIG. 3, the list of poll books on the network of FIG. 2 includes poll book A, with unique identifier "x.x.x.124", poll book B, with unique identifier "x.x.x.212", and so on, all the way through poll book F, with unique identifier "x.x.x.187".

Looking to FIG. 4, with the poll book unique identifier information collected, each poll book orders the list of unique identifiers according to a predetermined ordering scheme, preferably by placing the information in numerical order according to the IP address. Thus, as shown in FIG. 4, by ordering the unique identifiers numerically the order of poll books in the list is: poll book C, poll book A, poll book E, poll book F, poll book B, and poll book D. As indicated by the arrow in FIG. 4 linking the last entry in the list to the first entry, the ordered list forms a "ring" configuration where every entry in the list is adjacent to two other entries. For example, poll book B is adjacent to poll book F (preceding) and poll book D (following), and poll book D is adjacent to poll book B (preceding) and poll book C (following), and so forth.

Figure 5:
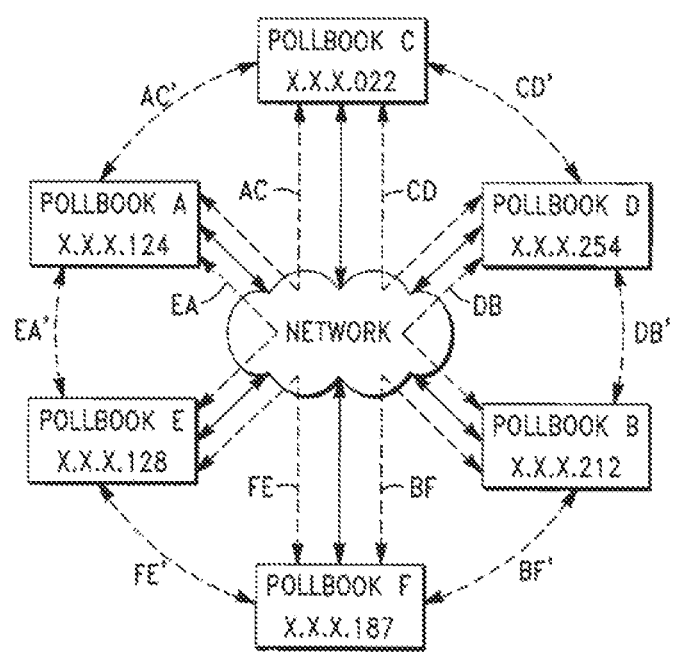
FIG. 5 is a block diagram of a configured ring network of electronic poll books in accordance with an exemplary embodiment of the present invention.

Turning to FIG. 5, each poll book, relying on the ordered list, establishes communication with two adjacent poll books according to that list. Thus, as shown in FIG. 5 in accordance with the ordered list of FIG. 4, poll book C establishes communication with poll book A and poll book D, poll book D establishes communication with poll book C and poll book B, and so on. The actual communication paths between adjacent poll books through the network are indicated in the drawing by dotted lines depicting communication between adjacent poll books through the network, labeled as CD, DB, BF, FE, EA, AC (where line CD indicates communication between poll books C and D, line DB indicates communication between poll books DB, and so on). The virtual "ring" communication path between adjacent poll books is indicated by the dotted lines directly between the adjacent poll books forming the ring network, labeled as CD', DB', BF', FE', EA', AC'. Thus, as seen in FIG. 5, the poll books are configured in a "ring" network, with a continuous path around the ring by communication through adjacent poll books.

With the poll book network thus arranged, voter database information may be synchronized between adjacent poll books by transmitting that information from one poll book to the next. For example, any changes made to voter database information at poll book C are synchronized by transmitting the changed data to poll book A and poll book D, which update their databases with that information. Likewise, any changes to voter database information at poll books A and D are transmitted to poll book C, which updates its database with that information. Furthermore, the updated database information received from poll book C by poll books A and D is designated by those poll books as updated information that is then further synchronized with the other poll books in communication with poll books A and D, namely, poll books E and B, respectively. Changed data from a poll book to be synchronized with other poll books is preferably sent as a message packet, or other data grouping. Each message packet includes a unique key identifying the source of the data. The key can be a unique integer number or other globally unique identifier (GUID). Other keys or tags may also be used in accordance with the present invention to track the source of the data being updated.

Thus, as can be seen in FIG. 5, database information thus propagates to all poll books connected in the ring network as the updated information is transmitted around the ring via adjacent poll books. Preferably, each poll book transmits its changed database information to adjacent poll books periodically, most preferably every ten minutes. Alternatively, that information could be transmitted as soon as it is changed or could be transmitted based on some other trigger event, such as opening or closing of polls. Voter database information may include any voter or election information, such as poll status, device status, ballot issued status, ballot cancelled status, voter status, or log events. The system and method of the present invention may be used whenever multiple poll books are in communication on a network, such as during early voting and election day voting, or any other situation in which the poll books are connected to the network.

As changed data propagates through the ring network to the various poll books, it will eventually make its way back to the original poll book source. The unique key or GUID associated with the data, as described above, identifies its source and allows the originating poll book to recognize that the data originated with it, and thus does not need to be updated. Similarly, any of the poll books can recognize the data and determine if that data has already been updated to its database, preventing multiple or redundant updates of the same data.

When the election is over, or at any other desired time, the synchronized database (i.e., the database from any of the poll books), or information from the synchronized database, can be copied back to a central server and eventually back to the central registration database. The synchronized database can be transferred via physical media, such as a flash drive, or may be transferred over a communication network when a central server is available on the network, either as part of the ring, or otherwise. Alternatively, synchronized data could be pushed to a central server periodically throughout the election. It should be understood that transfer ability to a central server is not necessary to the operation of the ring network as described.

In addition to the ring arrangement described with respect to the exemplary embodiment, other configurations of the electronic poll book communication network are anticipated by the present invention. For example, the poll books could be arranged in a tree (i.e., hierarchical) network where each poll book connects to a predetermined number of other poll books, or where poll books are redundantly connected to multiple other poll books. Alternatively, the poll books could be connected in a one-way ring configuration similar to that just described, but where information is synchronized only one way—for example, looking to FIG. 5, data could synchronize only clockwise, from poll book C, to D, to B, to F, to E, and to A, in a one-way ring configuration. These and other variations and configurations are within the scope of the present invention.

Looking to FIGS. 2 through 5, it should be understood that the system and method of the present invention is dynamic and self-configuring, such that additional poll books can be added to the network, or poll books can be removed from the network, at any time and the network will reconfigure itself based on those changes. For example, looking to FIG. 4, assume that a new poll book (e.g., poll book G, having a unique identifier of x.x.x.231) is connected to the network. Following the unique identifier broadcast and receive scheme described above, every poll book on the network would detect the new poll book and recreate an ordered list of poll books with new poll book G inserted between poll book B and poll book D shown in FIG. 4 (based on the IP address of new poll book G being x.x.x.231). Thus, poll book G would be included in the ring network adjacent to poll books B and D, and voter database synchronization would include poll book G. Similarly, if a poll book is removed (or a communication link with a poll book failed) the remaining poll books would reconfigure to exclude the removed poll book.

Thus, the system and method of the present invention provides a reliable, dynamic and robust network that does not rely on a single point of reference as does a system using a central voter database. Because there is no central voter database, there is no requirement to pre-configure a host server for the system, and, there is no single point of failure that could potentially interrupt operation of the system. The system and method of the present invention provide for automatic reconfiguration as poll books are added to, or removed from, the network (or if communication paths to poll books are interrupted). Additionally, the configuration accommodates lost packets by periodically synchronizing the databases, and limits the bandwidth used by the system by preventing over saturation of the network. The system and method thus is reliable in that in the event of a network failure (either local or global), individual poll place processing can continue uninterrupted, and is robust in that in the event of a catastrophic failure of any poll book, no data is lost because that same data is stored on all other poll books in the ring.

It should be understood that while the system and method of the present invention do not rely on a central voter database, a central voter database may be connected into the ring network or otherwise tied to the network to allow an up-to-date version of the voter database to be archived or backed-up, or, used to update the main voter registration database. The system and method of the present invention, however, do not rely on or require that central voter database to operate as described above.

While the present invention has been described and illustrated hereinabove with reference to exemplary embodiments, it should be understood that various modifications could be made to these embodiments without departing from the scope of the invention. Therefore, the invention is not to be limited to the specific systems and methods described and illustrated above, except insofar as such limitations are included in the following claims.

What is claimed and desired to be secured by Letters Patent is as follows:

1. A computer-implemented method for synchronizing voter databases between a plurality of electronic poll books, comprising:
provinding a plurality of electronic poll books operable to communicate over a network, each of said poll books having a unique identifier and comprising a database configured to store a plurality of voter records;
for each of said poll books:
transmitting an information packet comprising said unique identifier of said poll book over said network;
receiving a plurality of information packets comprising said unique identifiers of other of said poll books communicating over said network;

arranging said transmitted and received unique identifiers according to a predetermined ordering scheme;
establishing communication with at least one other poll book based on said ordered unique identifiers; and
exchanging voter record information with said at least one other poll book and updating said database with data received from said at least one other poll book to synchronize said poll book databases.

2. The computer-implemented method of claim 1, wherein said unique identifier comprises an IP address of said electronic poll book.

3. The computer-implemented method of claim 1, wherein said ordering scheme comprises a list of said unique identifiers in numerical order and wherein communication is established with two other poll books corresponding to the next higher and next lower unique identifiers in said list.

4. The computer-implemented method of claim 1, wherein said information packet is a UDP broadcast packet.

5. The computer-implemented method of claim 4, wherein said UDP broadcast packet is assigned to a pre-defined port.

6. The computer-implemented method of claim 1, wherein said communication is established using a TCP/IP connection on a pre-defined port.

7. The computer-implemented method of claim 1, wherein said exchange occurs at predetermined time intervals.

8. The computer-implemented method of claim 1, wherein said exchange occurs upon detection of a change in said voter record information in said database.

9. The computer-implemented method of claim 1, wherein said voter record information comprises poll status, device status, ballot issued status, ballot cancelled status, voter status, and combinations thereof.

10. The computer-implemented method of claim 1, further comprising:
providing a central database in communication with at least one of said poll books, said central database operable to receive voter record information from at least one of said electronic poll books to provide backup storage of said voter record information.

11. The computer-implemented method of claim 1, wherein said at least one other poll book comprises at least two other poll books.

12. A system for synchronizing voter databases between a plurality of electronic poll books communicating over a network, each of said poll books having a unique identifier and comprising:
a database configured to store a plurality of voter records;
a processor operable to:
transmit an information packet comprising said unique identifier of said poll book over said network;
receive a plurality of information packets comprising said unique identifiers of other of said poll books communicating over said network;
arrange said transmitted and received unique identifiers according to a predetermined ordering scheme;
establish communication with at least one other poll book based on said ordered unique identifiers; and
exchange voter record information with said at least one other poll book and update said database with data received from said at least one other poll book to synchronize said poll book databases.

13. The system of claim 12, wherein said unique identifier comprises an IP address of said electronic poll book.

14. The system of claim 12, wherein said ordering scheme comprises a list of said unique identifiers in numerical order and wherein communication is established with two other poll books corresponding to the next higher and next lower unique identifiers in said list.

15. The system of claim 12, wherein said information packet is a UDP broadcast packet.

16. The system of claim 15, wherein said UDP broadcast packet is assigned to a pre-defined port.

17. The system of claim 12, wherein said communication is established using a TCP/IP connection on a pre-defined port.

18. The system of claim 12, wherein said exchange occurs at predetermined time intervals.

19. The system of claim 12, wherein said exchange occurs upon detection of a change in said voter record information in said database.

20. The system of claim 12, wherein said voter record information comprises poll status, device status, ballot issued status, ballot cancelled status, voter status, and combinations thereof.

21. The system of claim 12, further comprising:
a central database in communication with at least one of said poll books, said central database operable to receive voter record information from at least one of said electronic poll books to provide backup storage of said information.

22. The system of claim 21, wherein said central database contains voter records for all registered voters in a jurisdiction.

23. The system of claim 12, wherein said at least one other poll book comprises at least two other poll books.

24. An electronic poll book, comprising:
a display;
a database comprising a plurality of voter records; and
a processor operable to:
transmit an information packet comprising a unique identifier of said poll book over a network;
receive a plurality of information packets comprising unique identifiers of a plurality of other poll books communicating over said network;
arrange said transmitted and received unique identifiers according to a predetermined ordering scheme;
establish communication with at least one other poll book based on said ordered unique identifiers; and
exchange voter record information with said at least one other poll book and update said database with data received from said at least one other poll book.

25. The electronic poll book of claim 24, wherein said unique identifier comprises an IP address of said electronic poll book.

26. The electronic poll book of claim 24, wherein said ordering scheme comprises a list of said unique identifiers in numerical order and wherein communication is established with two other poll books corresponding to the next higher and next lower unique identifiers in said list.

27. The electronic poll book of claim 24, wherein said information packet is a UDP broadcast packet.

28. The electronic poll book of claim 27, wherein said UDP broadcast packet is assigned to a pre-defined port.

29. The electronic poll book of claim 24, wherein said communication is established using a TCP/IP connection on a pre-defined port.

30. The electronic poll book of claim 24, wherein said exchange occurs at predetermined time intervals.

31. The electronic poll book of claim 24, wherein said exchange occurs upon detection of a change in said voter record information in said database.

32. The electronic poll book of claim 24, wherein said voter record information comprises poll status, device status, ballot issued status, ballot cancelled status, voter status, and combinations thereof.

33. The electronic poll book of claim 24, wherein said at least one other poll book comprises at least two other poll books.

34. A non-transitory computer-readable medium having instructions stored thereon for execution by a processor to perform a method for synchronizing voter databases between a plurality of electronic poll books, the method comprising:
   transmitting an information packet comprising a unique identifier of a poll book over a network;
   receiving a plurality of information packets comprising unique identifiers of other poll books communicating over said network;
   arranging said transmitted and received unique identifiers according to a predetermined ordering scheme;
   establishing communication with at least one other poll book based on said ordered unique identifiers; and
   exchanging voter record information with said at least one other poll book and updating a database with data received from said at least one other poll book.

35. The non-transitory computer-readable medium of claim 34, wherein said unique identifier comprises an IP address of said electronic poll book.

36. The non-transitory computer-readable medium of claim 34, wherein said ordering scheme comprises a list of said unique identifiers in numerical order and wherein communication is established with two other poll books corresponding to the next higher and next lower unique identifiers in said list.

37. The non-transitory computer-readable medium of claim 34, wherein said information packet is a UDP broadcast packet.

38. The non-transitory computer-readable medium of claim 37, wherein said UDP broadcast packet is assigned to a pre-defined port.

39. The non-transitory computer-readable medium of claim 34, wherein said communication is established using a TCP/IP connection on a pre-defined port.

40. The non-transitory computer-readable medium of claim 34, wherein said exchange occurs at predetermined time intervals.

41. The non-transitory computer-readable medium of claim 34, wherein said exchange occurs upon detection of a change in said voter record information in said database.

42. The non-transitory computer-readable medium of claim 34, wherein said voter record information comprises poll status, device status, ballot issued status, ballot cancelled status, voter status, and combinations thereof.

43. The non-transitory computer-readable medium of claim 34, wherein said at least one other poll book comprises at least two other poll books.

\* \* \* \* \*

UNITED STATES PATENT AND TRADEMARK OFFICE
CERTIFICATE OF CORRECTION

PATENT NO. : 8,812,594 B2
APPLICATION NO. : 12/771523
DATED : August 19, 2014
INVENTOR(S) : Talbot Iredale et al.

Page 1 of 1

It is certified that error appears in the above-identified patent and that said Letters Patent is hereby corrected as shown below:

Title Page,

Item 73, Assignee,
Delete "Electron" and insert -- Election -- therefor.

Signed and Sealed this
Fourteenth Day of October, 2014

Michelle K. Lee
*Deputy Director of the United States Patent and Trademark Office*